United States Patent
Ahn et al.

[11] Patent Number: 5,663,112
[45] Date of Patent: Sep. 2, 1997

[54] CEROUS CHLORIDE-CHROMIC OXIDE CATALYST FOR PRODUCING CHLORINE, METHODS FOR PRODUCING THE SAME AND A METHOD FOR PRODUCING CHLORINE

[75] Inventors: Byoung Sung Ahn; Dong Ju Moon; Kun You Park; Moon Jo Chung, all of Seoul, Rep. of Korea

[73] Assignee: Korea Institute of Science and Technology, Seoul, Rep. of Korea

[21] Appl. No.: 346,519

[22] Filed: Nov. 29, 1994

[30] Foreign Application Priority Data

Dec. 1, 1993 [KR] Rep. of Korea .................. 1993-26072

[51] Int. Cl.$^6$ ...................................... B01J 23/00
[52] U.S. Cl. ........................ 502/304; 502/302; 502/305; 502/319
[58] Field of Search .................... 502/302, 304, 502/305, 319

[56] References Cited

U.S. PATENT DOCUMENTS

| | | |
|---|---|---|
| 2,418,930 | 4/1947 | Gorin . |
| 2,418,931 | 4/1947 | Gorin . |
| 2,577,808 | 12/1951 | Pye et al. . |
| 4,119,705 | 10/1978 | Riegel et al. . |
| 4,828,815 | 5/1989 | Kiyoura et al. ............... 502/319 |
| 4,912,270 | 3/1990 | Carlson et al. ............... 570/169 |
| 5,169,823 | 12/1992 | Yoshikawa et al. ........... 502/319 |
| 5,449,656 | 9/1995 | Scott et al. ................... 502/319 |

FOREIGN PATENT DOCUMENTS

| | | |
|---|---|---|
| 53-125989 | 11/1978 | Japan . |
| 62-153103 | 7/1987 | Japan . |
| 62-191403 | 8/1987 | Japan . |
| 62-241805 | 10/1987 | Japan . |
| 62-275001 | 11/1987 | Japan . |
| 86-4802 | 7/1986 | Rep. of Korea . |
| 90-79 | 1/1990 | Rep. of Korea . |
| 90-2545 | 4/1990 | Rep. of Korea . |
| 676667 | 7/1952 | United Kingdom . |

*Primary Examiner*—Glenn A. Caldarola
*Assistant Examiner*—Elizabeth D. Wood
*Attorney, Agent, or Firm*—Darby & Darby

[57] ABSTRACT

A novel cerous chloride-chromium oxide catalyst useful for oxidizing hydrogen chloride to chlorine. The catalyst is prepared by the reaction of chromium trioxide and cerous chloride with ethanol and calcining the reaction product. The catalyst is also prepared by the reaction of chromium trioxide with ethanol, then calcination and impregnation of the resultant chromic oxide with aqueous solution of cerous chloride. The obtained catalyst exhibits high activity at low reaction temperature.

7 Claims, No Drawings

CEROUS CHLORIDE-CHROMIC OXIDE CATALYST FOR PRODUCING CHLORINE, METHODS FOR PRODUCING THE SAME AND A METHOD FOR PRODUCING CHLORINE

BACKGROUND OF THE INVENTION

1. Field of the Invention

The present invention relates to a novel catalyst useful for producing chlorine by oxidizing hydrogen chloride, a method for producing the catalyst and a method for producing chlorine by using the catalyst. More particularly, the present invention relates to a cerous chloride-chromic oxide ($CeCl_3$—$Cr_2O_3$) catalyst for producing chlorine, its method of preparation and a method for efficiently producing chlorine by using the catalyst.

2. Description of the Prior Art

Chlorine, an important material in the chemical industries, is used in a large quantity to prepare organochlorine compounds and in phosgenation reaction. Of the chlorine used, only a portion is utilized for producing products, and the rest is eliminated as hydrogen chloride gas. The hydrogen chloride gas by-product, is recovered in a useful form of 35% hydrochloric acid by absorbing it in water. However, since excess hydrochloric acid should be neutralized and discarded, it is disadvantageous from an economic point of view. In addition, when the neutralization is incomplete, it induces serious pollution problems.

Recently, research and development efforts have been directed to the utilization of the by-product hydrogen chloride by oxidation to chlorine, in order to solve the problem of surplus hydrogen chloride and to cope with the increasing demand for chlorine.

Since Deacon invented a copper catalyst for oxidizing hydrogen chloride to chlorine in 1868, a variety of catalysts, such as iron catalysts and chromium catalysts, have been reported. For example, the use of copper catalysts which were modified from Deacon catalysts, is suggested in U.S. Pat. Nos. 2,418,930, 2,418,931 and 4,119,705, and Japanese Patent Laid-Open Publication No. Sho.53-125,989. However, the copper catalysts generally have a short life time, because the catalytic reactions should be carried out at high temperature of at least 400° C. An iron catalyst is disclosed in U.S. Pat. No. 2,577,808, but this catalyst has a short life time because of the high reaction temperature, i.e., at least 400° C.

A chromium catalyst is proposed in U.K. Patent No. 676,667, as a substituent for the copper or iron catalyst. The catalyst is prepared by dissolving chromium trioxide ($CrO_3$) in water, drying and reacting with hydrogen at 200° C. for 4 hours to give chromic oxide ($Cr_2O_3$). The conversion of hydrogen chloride to chlorine using the catalyst thus obtained ranges from about 60 to about 7%. The catalyst, however, also has a short life time since the catalytic reaction for producing chlorine is carried out at high temperature of at least 400° C.

Many patents, for example, Korean Patent Publication Nos. 86-4802, 90-79 and 90-2545, and Japanese Patent Laid-Open Publication Nos. Sho. 62-153103, 62-191403, 62-241805 and 62-275001, use chromic oxide ($Cr_2O_3$) as catalysts for producing chlorine. The catalysts are prepare by dissolving chromium nitrate in de-ionized water, reacting it with a basic compound such as ammonia water, and calcining the precipitate thus obtained.

The chromium oxide catalysts mentioned in those patents are similar to MT-Chloro (trade name, commercially available from Mitsui Toatsu Chemical., Japan), which is prepared by dissolving chromic nitrate nonahydrate ($Cr(NO_3)_3 \cdot 9H_2O$) or chromium trioxide ($CrO_3$) in de-ionized water, adding 25% ammonia water dropwise to the solution, and subjecting the precipitate obtained through a series of treatments, for example, filtering, washing, drying and calcining, to give chromic oxide ($Cr_2O_3$), and impregnating it on $SiO_2$. The conversion of hydrogen chloride by MT-Chloro catalyst is in a range of 63 to 79%.

In processes for producing chlorine by use of the chromium catalysts reported up to now, the chromium catalysts are prepared by treating aqueous chromium salt with an alkaline earth hydroxide or an aqueous alkaline carbonate solution, and applying to the precipitate thus obtained a series of treatments including filtration, washing, drying and calcining. However, the obtained catalyst still has low activity and requires relatively high reaction temperature, causing the problem of a short life time.

SUMMARY OF THE INVENTION

Therefore, it is an object of the present invention to provide a catalyst for the oxidation of hydrogen chloride to chlorine with superior activity.

It is another object of the present invention to provide a method for producing such catalyst.

It is a further object of the present invention to provide an economical method for producing chlorine by the reaction of hydrogen chloride with oxygen in the presence of the catalyst according to the present invention.

Cerous chloride—chromic oxide catalyst of the present invention is produced by the reaction of an aqueous solution of chromium trioxide ($CrO_3$) and cerous chloride ($CeCl_3$) with ethanol, and calcining the reaction mixture after drying. This is the coprecipitation method. Alternatively, the catalyst of the present invention is also prepared by the reaction of chromium trioxide ($CrO_3$) with ethanol, then calcining and impregnating the resultant chromic oxide($Cr_2O_3$) with an aqueous solution of cerous chloride. It is the impregnation method. The catalysts obtained by the present invention allows the conversion of hydrogen chloride to chlorine in the range of 75–85% at the reaction temperature of 360°–380° C., which is higher at lower temperature range compared to that of the conventional catalysts. Thus, it becomes possible to produce chlorine efficiently, by using the catalyst in accordance with the present invention.

DETAILED DESCRIPTION OF THE INVENTION

In accordance with the present invention, the catalysts for the oxidation of hydrogen chloride to chlorine can be prepared by the reaction of ethanol with an aqueous solution of chromium trioxide ($CrO_3$) and cerous chloride ($CeCl_3$) at the reflux temperature of at least 90° C. to obtain hydrated cerous chloride-chromic oxide ($CeCl_3$—$Cr_2O_3$) followed by drying at 100°–140° C. and calcining at 350°–500° C., preferably 360°–380° C. for 1–10 hours, and even more preferably for 3–6 hours. Alternatively, the catalyst of the present invention is also prepared by the reaction of chromium trioxide ($CrO_3$) with ethanol to obtain chromic oxide ($Cr_2O_3$) precipitate, then drying, calcining and impregnating it with cerous chloride. The amount of cerous chloride is 5% or less, more preferably 2% or less on the basis of the weight of chromic oxide. The reaction time, calcining temperature and calcining time may vary depending on the amount of the catalyst to be produced. The use of the catalyst according to the present invention increases the conversion of hydrogen chloride at a relatively low temperature. The reason for this is considered to be due to the added cerium which forms the reversible oxidation-reduction system of $Ce^{4+}$ and $Ce^{3+}$ while supplying oxygen to the chromium oxide catalyst which promotes the formation of $Cr_2O_3.O$, known as an intermediate of oxidation-reduction reaction of hydrogen chloride.

The preferred embodiment of the present invention will now be further described with reference to specific examples.

In the following examples, the flow rates of the gases are calculated based on 0° C. at 1 atm, and contact times are based on the flow rate at the reactor inlet.

A reactor used in the oxidation of hydrogen chloride is made of a nickel tube having a length of 35 cm and an outer diameter of 2.54 cm with a wall thickness of 0.15 cm.

The activity of the catalyst to convert hydrogen chloride to chlorine is measured by absorbing the gaseous effluent from the reactor in a 10% aqueous potassium iodide solution, titrating this mixture with an aqueous sodium thiosulfate solution to quantitate chlorine produced, and titrating with an aqueous sodium hydroxide to quantitate un-reacted hydrogen chloride.

PREPARATION OF CATALYST

PREPARATION EXAMPLE 1

300 g of chromium trioxide ($CrO_3$) and 1.97 g of cerous chloride ($CeCl_3$) were dissolved in 2 L of distilled water, and 150 ml of ethanol was added at a rate of 8 ml/min. After the resulting solution was left to stand for about 4 hours, 150 ml of additional ethanol was added at the same rate.

This reaction mixture was heated at the temperature of at least 90° C. to reflux it for 15 hours with vigorous stirring in order to prevent bumping. After the reaction, dark brown precipitate was filtered and dried at 110° C. without washing to obtain 270 g of cerous chloride-chromic oxide gel. The gel was calcined at 450° C. for 5 hours, to obtain 223 g of fine powdery cerous chloride-chromic oxide.

As an additive for pelletizing the catalyst, stearic acid amounting to 5% by weight of the obtained chromic oxide was dissolved in chloroform ($CHCl_3$) and mixed with the finely powdery catalyst.

Subsequently, the stearic acid-treated powder was pelletized in a dimension of $\phi 4$ mm×4 mm and calcined at 350° C. under a nitrogen atmosphere to remove the stearic acid, giving 220 g of cerous chloride-chromic oxide ($CeCl_3$—$Cr_2O_3$) catalyst.

PREPARATION EXAMPLE 2

225 g of a fine powdery cerous chloride-chromic oxide catalyst was produced in the same way as in Preparation Example 1 except that 3.94 g of cerous chloride ($CeCl_3$) was used. The catalyst was pelletized and calcined in the same way as in Preparation Example 1 to obtain 222 g of cerous chloride-chromic oxide catalyst.

PREPARATION EXAMPLE 3

300 g of chromium trioxide ($CrO_3$) was dissolved in 2 L of distilled water, and 150 ml of ethanol was added at a rate of 8 ml/min. After the resulting solution was left to stand for about 4 hours, 150 ml of additional ethanol was added at the same rate.

This reaction mixture was heated at the temperature of at least 90° C. to reflux it for 15 hours with vigorous stirring in order to prevent bumping. After filtering, drying and calcining in the same way as in Preparation Example 1, 225 g of chromic oxide ($Cr_2O_3$) was obtained. 220 g of this catalyst was impregnated with 1.97 g of cerous chloride which was dissolved in water, and then the catalyst was dried and calcined to obtain fine powdery cerous chloride-chromic oxide. The catalyst was pelletized and calcined in the same way as in Preparation Example 1 to obtain 220 g of cerous chloride-chromic oxide catalyst.

PREPARATION OF CHLORINE BY USING THE CATALYST OF THE PRESENT INVENTION

EXAMPLE 1

45 g of the catalyst prepared in Preparation Example 1 was charged in a fixed bed reactor. Gaseous hydrogen chloride and oxygen were supplied to the reactor at a rate of 300 cc/min and 150 cc/min, respectively. The reaction temperature was maintained at 360° C.

After the reaction, effluent gas from the reactor was absorbed in 10% aqueous potassium iodide solution and titrated with an aqueous sodium thiosulfate to quantitate the chlorine produced, and un-reacted hydrogen chloride was quantitated by titrating it with an aqueous sodium hydroxide solution.

The conversion of hydrogen chloride to chlorine was 81.9%.

EXAMPLE 2

Chlorine was produced in the same way as in Example 1 in the presence of the catalyst of Preparation Example 1 except that the reaction temperature was kept at 380° C. The detailed reaction conditions are summarized in Table 1. The conversion to chlorine was 85.0%.

EXAMPLE 3

Chlorine was produced in the same way as in Example 1 in the presence of the catalyst of Preparation Example 1 except that the reaction temperature was kept at 380° C. and oxygen was supplied at a rate of 225 cc/min. The detailed reaction conditions are summarized in Table 1. The conversion to chlorine was 85.2%.

EXAMPLE 4

Chlorine was produced in the same way as in Example 1 in the presence of the catalyst of Preparation Example 1 except that the reaction temperature was kept at 380° C. and the amount of the catalyst was 24 g. The detailed reaction conditions are summarized in Table 1. The conversion to chlorine was 79.3%.

EXAMPLE 5

Chlorine was produced in the same way as in Example 1 except that the catalyst of Preparation Example 2 was used. The detailed reaction conditions are summarized in Table 1. The conversion to chlorine was 77.5%.

EXAMPLE 6

Chlorine was produced in the same way as in Example 5 except that the reaction temperature was kept at 380° C. The detailed reaction conditions are summarized in Table 1. The conversion of hydrogen chloride to chlorine was 82.5%.

EXAMPLE 7

Chlorine was produced in the same way as in Example 1 except that 45 g of the catalyst of Preparation Example 3 was used. The detailed reaction conditions are summarized in Table 1. The conversion of hydrogen chloride to chlorine was 78.2%.

EXAMPLE 8

Chlorine was produced in the same way as in Example 7 except that the reaction temperature was kept at 380° C. The detailed reaction conditions are summarized in Table 1. The conversion of hydrogen chloride to chlorine was 84.0%.

Reaction conditions and results of the aforementioned Examples 1 to 8 are given as shown in the following Table 1.

TABLE 1

Reaction Conditions and Results of the Examples

| Exam. No. | Catalyst Preparation Method | Ce content (%) | Feed Rate (cc/min) HCl | O$_2$ | Reaction Temp. (°C.) | Contact Time* (sec) | Conversion (%) |
|---|---|---|---|---|---|---|---|
| 1 | Coprecipitaion | 0.5 | 300 | 150 | 360 | 4.00 | 81.9 |
| 2 | Coprecipitaion | 0.5 | 300 | 150 | 380 | 4.00 | 85.0 |
| 3 | Coprecipitaion | 0.5 | 300 | 225 | 380 | 3.43 | 85.2 |
| 4 | Coprecipitaion | 0.5 | 300 | 150 | 380 | 2.13 | 79.3 |
| 5 | Coprecipitaion | 1.0 | 300 | 150 | 360 | 4.00 | 77.5 |
| 6 | Coprecipitaion | 1.0 | 300 | 150 | 380 | 4.00 | 82.5 |
| 7 | Impregnation | 0.5 | 300 | 150 | 360 | 4.00 | 78.2 |
| 8 | Impregnation | 0.5 | 300 | 150 | 380 | 4.00 | 84.0 |

*based on the inlet condition

Comparative Example 1

Preparation of Catalyst 300 g of chromium trioxide (CrO$_3$) was dissolved in 2 L of distilled water and 150 ml of ethanol was added to the aqueous chromium trioxide solution at a rate of 8 ml/min. After the resulting solution was left to stand for about 4 hours, 150 ml of additional ethanol was added at the same rate.

This reaction mixture was heated to the temperature of at least 90° C. to reflux it for 15 hours with vigorous stirring in order to prevent bumping. Following the same method as in Preparation Example 1, the reaction mixture was filtered, dried and calcined to obtain 223 g of fine powdery chromic oxide (Cr$_2$O$_3$). This catalyst was pelletized and calcined as in Preparation Example 1 to obtain 220 g of chromic oxide catalyst.

The same procedure as in Example 1 was repeated using 45 g of this catalyst to produce chlorine. The conversion of hydrogen chloride to chlorine was 72.3%.

Comparative Example 2

The same procedure as in Comparative Example 1 was repeated except that the reaction temperature was kept at 380° C. The reaction conditions are summarized in Table 2. The conversion of hydrogen chloride to chlorine was 82.3%.

Comparative Example 3

500 g of chromium nitrate (Cr(NO$_3$)$_3$. 9H$_2$O) was dissolved in 4 L of distilled water, and 10% ammonia water was added for precipitation until the solution reached pH9.0. This precipitate was filtered and washed. Thereafter, the washed precipitate was dried at 110° C. for 15 hours and calcined at 500° C. for 5 hours, to give 92 g of a chromic oxide catalyst.

Subsequently, this chromic oxide was pelletized and calcined to obtain 68 g of chromic oxide (Cr$_2$O$_3$) catalyst.

45 g of this catalyst was charged in the fixed bed reactor to produce chlorine. The reaction conditions were the same as in Example 1 except that the reaction temperature was kept at 380° C. The reaction conditions are summarized in Table 2. The conversion of hydrogen chloride to chlorine was 62.5%.

Comparative Example 4

The same procedure was repeated as in Comparative Example 3 except that the reaction temperature was kept at 400° C. The reaction conditions are summarized in Table 2. The conversion to chlorine was 75.0%.

Experimental results obtained in the above Comparative Examples 1 to 4 are given in the Table 2.

TABLE 2

Reaction Conditions and Results of the Comparative Examples

| Comp. Exam. No. | Feed Rate (cc/min) HCl | O$_2$ | Reaction Temp. (°C.) | Catalyst Precursor | Contact Time* (sec) | Conversion (%) |
|---|---|---|---|---|---|---|
| 1 | 300 | 150 | 360 | CrO$_3$ | 4.00 | 72.3 |
| 2 | 300 | 150 | 380 | CrO$_3$ | 4.00 | 82.3 |
| 3 | 300 | 150 | 380 | Cr(NO$_3$)$_3$.9H$_2$O | 4.00 | 62.5 |
| 4 | 300 | 150 | 400 | Cr(NO$_3$)$_3$.9H$_2$O | 4.00 | 75.0 |

*based on the inlet condition

From the above Examples and Comparative Examples, it is apparent that the catalysts according to the present invention are superior to those of the conventional art in the conversion of hydrogen chloride to chlorine at low temperature e.g., 360° C.

What is claimed is:

1. A catalyst for oxidizing hydrogen chloride to chlorine consisting of cerous chloride (CeCl$_3$) and chromic oxide (Cr$_2$O$_3$) wherein the amount of cerous chloride is 0.1 to 5 wt % based on the weight of the chromic oxide.

2. A process for preparing a catalyst for oxidizing hydrogen chloride to chlorine consisting of cerous chloride (CeCl$_3$) and chromic oxide (Cr$_2$O$_3$) containing the cerous chloride in the amount of 0.1 to 5 wt % based on the weight of the chromic oxide, comprising the reaction of an aqueous solution mixture of chromium trioxide and cerous chloride with ethanol, and calcination of the resultant reaction product, wherein the reaction temperature for the reaction with ethanol is at least 90° C. and the calcination is carried out in air at a temperature in the range of 350° to 500° C. for 3 to 6 hours.

3. A process for preparing a catalyst for oxidizing hydrogen chloride to chlorine consisting of cerous chloride ($CeCl_3$) and chromic oxide ($Cr_2O_3$) containing the cerous chloride in the amount of 0.1 to 5 wt % based on the weight of the chromic oxide, comprising the reaction of chromium trioxide aqueous solution with ethanol, then calcination and impregnation of the resultant chromic oxide with an aqueous solution of cerous chloride, wherein the reaction temperature for the reaction with ethanol is at least 90° C. and the calcination is carried out in air at a temperature in the range of 350° to 500° C. for 3 to 6 hours.

4. The process as claimed in claim 2, wherein the reaction temperature with ethanol is at last 90° C.

5. The process as claimed in claim 2, wherein the calcination is carried out in air at temperature range of 350° to 500° C. for 3 to 6 hours.

6. The process as claimed in claim 3, wherein the reaction temperature with ethanol is at least 90° C.

7. The process as claimed in claim 3, wherein the calcination is carried out in air at temperature range of 350° to 500° C. for 3 to 6 hours.

* * * * *